United States Patent
Amorosa et al.

(10) Patent No.: US 8,264,707 B2
(45) Date of Patent: Sep. 11, 2012

(54) ENFORCING REPRODUCTION RIGHTS FOR HARD COPIES OF DOCUMENTS

(75) Inventors: Lorenzo Amorosa, Bojano (IT); Remo Freddi, Ronciglione (IT); Bruno Portaluri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 12/348,411

(22) Filed: Jan. 5, 2009

(65) Prior Publication Data
US 2010/0171986 A1   Jul. 8, 2010

(51) Int. Cl.
G06K 15/00 (2006.01)
H04N 1/40 (2006.01)

(52) U.S. Cl. ...................................... 358/1.14; 358/1.15

(58) Field of Classification Search .................. 358/1.1, 358/1.9, 1.13, 1.14, 1.15, 1.18, 3.26, 3.28, 358/500, 505, 538, 539; 382/100, 112, 115, 382/119, 181
See application file for complete search history.

(56) References Cited

U.S. PATENT DOCUMENTS

| | | | |
|---|---|---|---|
| 4,179,212 A | 12/1979 | Lahr | |
| 5,949,885 A | 9/1999 | Leighton | |
| 6,700,989 B1 * | 3/2004 | Itoh et al. | 382/100 |
| 6,738,491 B1 * | 5/2004 | Ikenoue et al. | 382/100 |
| 7,184,571 B2 * | 2/2007 | Wang et al. | 382/100 |
| 7,266,215 B2 * | 9/2007 | Ikenoue et al. | 382/100 |
| 7,388,965 B2 * | 6/2008 | Ikenoue | 382/100 |
| 7,463,752 B2 * | 12/2008 | Ikenoue | 382/100 |
| 2003/0197054 A1 | 10/2003 | Eunson | |

* cited by examiner

*Primary Examiner* — Gabriel Garcia
(74) *Attorney, Agent, or Firm* — Stephen J. Walder, Jr.; Jeffrey S. LaBaw

(57) ABSTRACT

Mechanisms for enforcing reproduction rights for hard copies of physical hard copy articles are provided. The mechanisms electronically scan a surface of the physical hard copy article using a scanning mechanism to generate scanned data. A reproduction control identifier is extracted from the scanned data and output of a copy of the article is controlled based on the reproduction control identifier that was extracted from the scanned data. The physical hard copy article has a plurality of reproduction control identifiers present in multiple locations on the surface of the physical hard copy article such that content of portions of the physical hard copy article provided on the surface cannot be electronically scanned by the scanning mechanism without detecting a reproduction control identifier.

18 Claims, 4 Drawing Sheets

ENFORCING REPRODUCTION RIGHTS FOR HARD COPIES OF DOCUMENTS

BACKGROUND

The present application relates generally to an improved data processing system and method. More specifically, the present application is directed to mechanisms for enforcing reproduction rights on physical hard copies of documents.

With increased access to information using today's technology, much effort has been made to attempt to protect authors, publishers, and other entities who invest in the creation, publication, and distribution of copyrighted material from unauthorized reproduction, i.e. pirating, of the copyrighted works. Much of these efforts are directed to providing software to protect electronic works, such as electronic documents, digital copies of music, movies, software, and the like. While there are a number of products available that work quite well at helping to curb rampant pirating of electronic works, there are very few solutions that work well at reducing the unauthorized reproduction of physical hard copies of copyrighted works, such as a copyrighted document, book, or the like.

In order to help reduce the amount of unauthorized copying of physical hard copies of documents, some mechanisms have been developed for controlling the reproduction of these physical hard copies. For example, in one mechanism, paper sheet documents bearing an optically transparent, copyright intelligence code are provided. In the simplest form, the code indicates that the document is subject of copyright and functions with a decoding means and an interlock means of the copy printer that prevents operation of the printer until the necessary accounting data for the transaction has been entered into an automated transaction accounting system associated with the copy printer. In other embodiments of this mechanism, the code can include certain basic copyright intelligence such as the identity of the publisher or copyright holder and the document classification. More sophisticated codes can include the complete digital coding of the book or serial numbering system.

In another mechanism, a watermarking procedure is provided such that each of a set of copies of the work has a slightly modified form of a baseline watermark that is placed in a critical region of the data. The slight variations in the watermarks, however, are not perceptually visible and do not interfere with the works. If multiple persons collude to attempt to create an illicit copy of the work, i.e. a copy without a watermark, however, at least one of the modified watermarks is present in the copy, thereby identifying both the illicit copy and the copier. In this way, a digital watermarking process is provided that may be used as evidence in a court because it is robust against collusion.

In still another mechanism, a barcode is provided on each page of a document, such as over or under the normal text and graphics on the page, using special ink, dye, etching, film, electronic, or other processes. Barcode readers are placed in photocopiers along with a memory device for collecting data regarding the documents photocopied and the number of copies for eventual repayment to owners of the intellectual property associated with the document, i.e. authors, publishers, and the like.

Thus, the known mechanisms provide for a single watermark or barcode on a page of a document to identify that the document is copyrighted. Moreover, the known mechanisms provide a local storage of information about the identity of documents copied and the number of copies on a local storage device which can then be used by the provider of the copying machine to provide compensation to the intellectual property owners. Further, the known mechanisms provide a local input mechanism and communication mechanism for entry of accounting information, i.e. payment information, to allow copying of a copyrighted work, which may then be transmitted to a remote accounting system.

SUMMARY

In one illustrative embodiment, a method, in a data processing system, is provided for controlling reproduction of a physical hard copy article. The method comprises electronically scanning a surface of the physical hard copy article using a scanning mechanism to generate scanned data. Moreover, the method comprises extracting a reproduction control identifier from the scanned data and controlling output of the copy of the article based on the reproduction control identifier that was extracted from the scanned data. The physical hard copy article has a plurality of reproduction control identifiers present in multiple locations on the surface of the physical hard copy article such that content of portions of the physical hard copy article provided on the surface cannot be electronically scanned by the scanning mechanism without detecting a reproduction control identifier.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
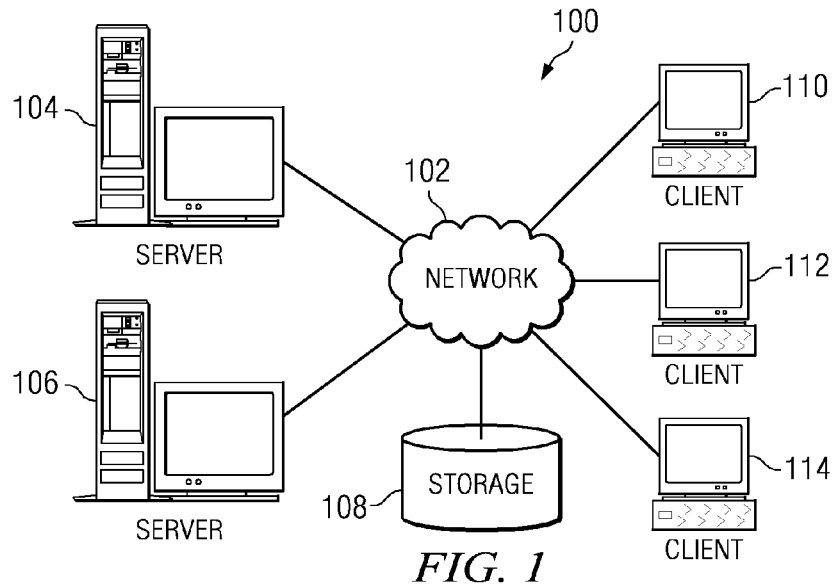
FIG. 1 is an exemplary block diagram of a distributed data processing system in which exemplary aspects of the illustrative embodiments may be implemented.

The illustrative embodiments provide mechanisms for including identification information at multiple locations of each page of a physical hard copy of a document, or other physical hard copy article, in order to increase the difficulty of unauthorized reproduction of the document. The identification information is read by a copier, scanner, or optical machine for purposes of reproduction of the physical hard copy document in either a hard copy or electronic form. This identification information is used to communicate, via one or more data networks, with a remotely located authorization, accounting, and billing system which can authorize the reproduction of the document, account for the number of copies and the party performing the copying, and bill the party appropriately. Such authorization may be based on licensing information maintained by the remote system in a centralized knowledge base which can be easily updated. The authorization may further be based on the entry of a key code supplied to the party requesting the copying of the document and which must be entered into the copier, scanner, or the like, by the party in order to have the copying authorized by the remote system.

Moreover, the illustrative embodiments provide mechanisms for providing different identification information for different portions of the document, different portions of the page, etc. so as to associate different licensing terms with different portions of the document. Thus, one portion of a document may have different licensing provisions, e.g., numbers of copies permitted, royalty rates, etc., with regard to copying that portion of the document than another portion. This may be especially useful for documents that are compilations, documents having different photographs, illustrations, or the like, and other documents having differing portions provided by different sources. Furthermore, having different identification information for different portions of the document can be used to prevent a party from reproducing an entire document without purchasing a complete new copy of the hard copy document.

The mechanisms of the illustrative embodiments may further be used to automatically generate digital rights information which may be added to metadata or header information for an electronic file generated from the physical hard copy document, such as by scanning using a scanner and associated computer. For example, based on the identification information read from the physical hard copy of the document, and the licensing information retrieved from the remote system in response to the reading of the identification information, digital rights information may be automatically associated with the resulting electronic document file to control access to the electronic copy of the physical hard copy document. This digital rights information may be used to control whether the electronic document file may be printed, copied, transmitted, or even viewed by a computing device.

Since different portions of the physical hard copy document may have different identification information, as discussed above, there may be different digital rights information for different portions of the electronic document file. Thus, for example, the electronic file may be opened by an application, such as a word processor, but portions of the document may not be viewable due to the digital rights information for those portions, may not be printed when the document is printed due to the digital rights information, or the like.

Figure 2:
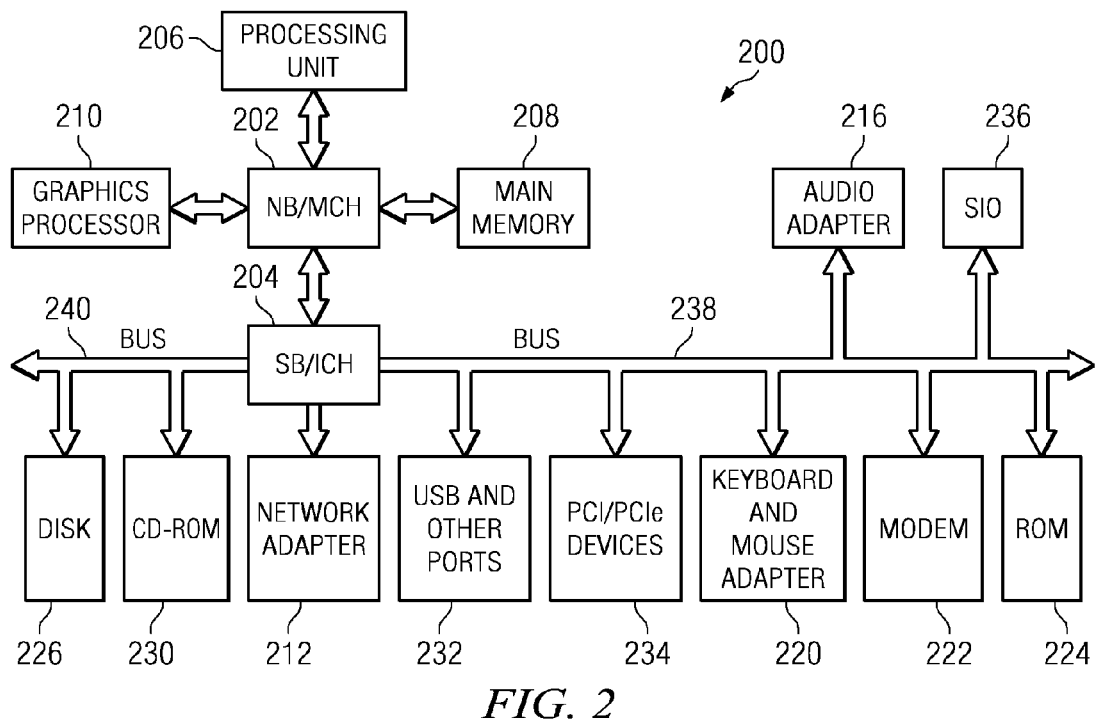
FIG. 2 is an exemplary diagram of a computing system in which exemplary aspects of the illustrative embodiments may be implemented.

Since the illustrative embodiments communicate with a remotely located authorization, accounting, and billing system, the illustrative embodiments are especially well suited for use with a distributed data processing environment in which recipients of communications may be widely disbursed to users of computing devices via one or more data networks. In order to provide a context for the description of the specific elements and functionality of the illustrative embodiments, FIGS. 1 and 2 are provided hereafter as exemplary environments in which exemplary aspects of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

While FIG. 2 is shown as a data processing system which may be a client computing device, such as personal computer, or a server computing device, as mentioned above, this data processing system may take many different forms including a computerized photocopier machine or the like. It should be appreciated that with regard to a computerized photocopier machine, elements of the data processing system shown in FIG. 2 that are not needed to implement the operation of the photocopier machine, such as the hard disk 226 for example, in accordance with the illustrative embodiments may be eliminated to reduce the cost of the photocopier machine.

Moreover, the data processing system may have an associated scanner machine, which may be provided as one of the peripheral devices 226 or 230, or may be coupled to the data processing system, such as via the communication ports 232. In accordance with the illustrative embodiments, the photocopier machine, scanner, or the like, scans a physical hard copy of a document and has mechanisms for detecting machine readable identification information imprinted on the physical pages of the document indicating an identification of the document, and in some illustrative embodiments, an indication of the portion of the document upon which the identification information is imprinted. The photocopier machine, computing device coupled to the scanner, or the like, has a mechanism for communicating the identification information to a remote system for obtaining authorization to complete the copying/scanning of the portion of the physical hard copy document. The photocopier machine, computing device coupled to the scanner, or the like further has logic for permitting or denying completion of the copying/scanning of the portion of the physical hard copy document based on a response from the remote system. Further illustrative embodiments have additional logic for performing more complex authorization, accounting, and billing operations based on the identification information read from the physical hard copy of the document as will be detailed hereafter.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
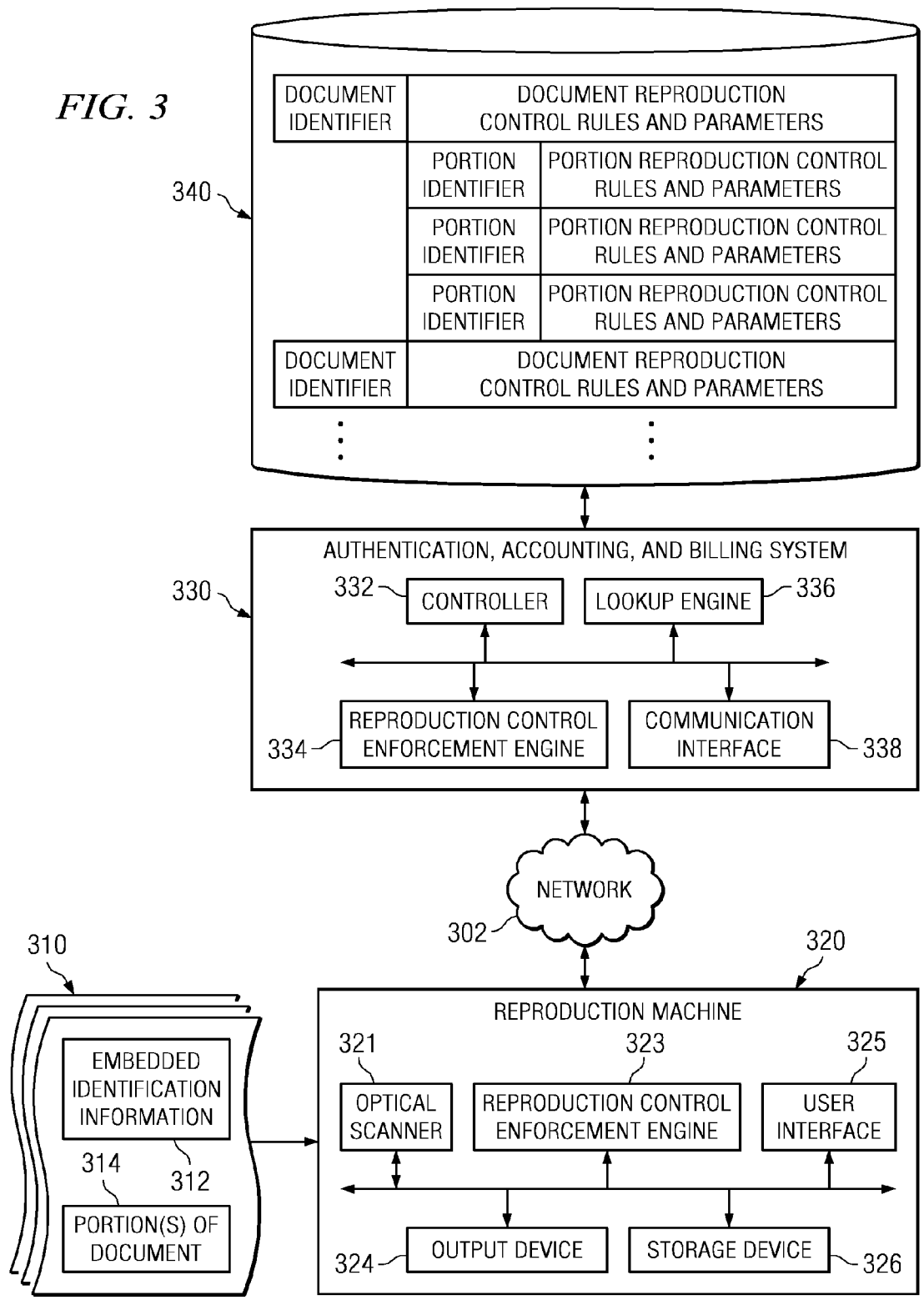
FIG. 3 is an exemplary block diagram of the primary operational elements of one illustrative embodiment.

FIG. 3 is an exemplary block diagram of the primary operational elements of one illustrative embodiment. For purposes of the discussion of this illustrative embodiment, it is assumed that the reproduction machine 320 is a photocopier machine having a computer control unit that has hardware logic and/or software that controls the operation of the photocopier machine 320 with regard to the reproduction of physical hard copy documents as physical hard copy copies. The control of the photocopier machine 320, with regard to various possible implementations of the illustrative embodiment, will now be described. It should be appreciated that these various possible implementations may be used separately or together to achieve the particular purposes or desires of the individual using, owning, or otherwise associated with the photocopier machine 320.

Moreover, it should be appreciated that while the illustrative embodiments hereafter will make reference to a physical hard copy "document" or portions and pages of a physical hard copy "document", the illustrative embodiments are not limited to physical hard copy documents. To the contrary, the illustrative embodiments apply to the reproduction of any physical hard copy article in either a physical hard copy reproduction or an electronic reproduction. Such articles include any physical article that may be scanned or read by a reproduction machine, such as reproduction machine 320. Examples of such articles include photographs, books, newspapers, signs, magazines, pages from any of these articles, and the like.

In accordance with the illustrative embodiments, a physical hard copy document 310 is provided with machine readable identification information 312 for identifying the identity of the document 310. For example, the identification information 312 may be an International Standard Book Number (ISBN), title/author information, title/volume/number for periodicals, or any other identification information that uniquely identifies the document 310 with regard to a particular tracking system. In one illustrative embodiment, the identification information 312 may be identification information for the entire document 310. In another illustrative embodiment, the identification information 312 may be for the particular portion of the physical hard copy document 310 with which the identification information 312 is associated. In still a further illustrative embodiment, the identification information 312 may be a combination of identification information for the document 310 as a whole and identification information specific to the particular portion of the document 310 with which the identification information is associated.

Thus, for example, a first portion of a document 310 in a plurality of portions 314 of the document 310, such as a first page of the document 310, may have first identification information that identifies the document 310 and the first page, and second identification information on a second page of the document 310 may identify the document 310 and the second page. Such portions may be pages, portions of pages, an individual line of a page of the document 310, a particular illustration or photograph on a page of the document 310, a particular paragraph of the page of the document 310, or any other sub-part of the document 310. Hence, a single page of a document 310 may have many different types of identification information, e.g., many different identifiers within the identification information 312 for the page, provided on the page based on the particular portions present on the page.

The identification information 312 may be encoded in any of a number of different ways. For example, the identification information 312 may be encoded as a barcode, as a series of dots of various patterns, or any other machine readable encoding of information. The encoded information may be imprinted, applied, or otherwise made part of the pages of the physical hard copy document 310. For example, in one illustrative embodiment, the encoded identification information may be applied to the pages of the physical hard copy document 310 in the manner described U.S. Pat. No. 4,179,212 entitled "Demand Publishing Royalty Accounting System," issued Dec. 18, 1979. Alternatively, the encoded identification information may be printed or otherwise applied through a watermarking process, such as described in U.S. Pat. No. 5,949,855, entitled "Method for Protecting Content Using Watermarking," issued Sep. 7, 1999, for example. Of course other mechanisms for imprinting, applying, or otherwise making the encoded identification information 312 part of the physical hard copy document 310 pages may be used without departing from the spirit and scope of the illustrative embodiments.

In one illustrative embodiment, the identification information 312 is provided in such a manner that the identification information 312 is not visible to the human eye. That is, the identification information 312 is printed or otherwise provided in an ink, dye, or other manner that is not visible but is still detectable by optical, electrical, and/or electromagnetic mechanisms that are provided as part of the reproduction machine 320, e.g., the photocopier machine. For example, in one illustrative embodiment, the photocopier machine 320 is provided with an optical scanner 321 capable of detecting the presence of the identification information on the pages of the document 310, such as by using an optical filter or other mechanism that detects the wavelength, color, or the like, of reflected light from the surface of the pages of the document 310. In this way, the identification information can be placed anywhere on the pages of the document 310 without obscuring the actual text, photographs, illustrations, or the like, on the pages of the document 310.

Moreover, because the identification information 312 is not visible to the human eye, the user may not be made aware of the presence of the identification information 312. Thus, the identification information 312 may be randomly placed at different locations on each page of the document 310. Moreover, the identification information 312 may be randomly placed at a plurality of different locations on the same page. This may reduce the ability of a person attempting to make an unauthorized reproduction of the document 310, or portions of the document 310, to obscure the identification information 312 from detection by the photocopier machine 320. That is, if a user knows that the identification information 312 is in a particular place on each page of the document 310, the user may place a sheet of paper, fold the page of the document 310, or otherwise eliminate the ability of the photocopier machine 320 to detect the presence of the identification information 312. With some illustrative embodiments of the present invention, the identification information 312 is not visible to the human eye and is placed at random locations of each page such that the user is not aware of where the identification information 312 is and thus, cannot obscure it on a regular basis so as to avoid the further operations of the illustrative embodiments as described hereafter.

In still another illustrative embodiment, the identification information 312 is provided in association with each portion of each page of the document 310. These portions may be individual lines of text of the page, illustrations on the page, photographs on the page, or the like. In one illustrative embodiment, the identification information 312 is provided in association with each individual line of text of each page of the document 310. In addition, identification information 312 may be provided in association with each illustration and/or photograph on each page of the document 310, if any. The identification information 312 may be provided, for example integrated with the line of text, the illustration, the photograph, or the like, such that the text/illustration/photograph cannot be separated from the identification information 312 but, by virtue of the identification information 312 not being visible to the human eye, is not perceived by the reader/user.

The identification information 312 may be different for each portion of each page of the document 310. For example, assume that the document 310 is a compilation of stories from a plurality of different authors. Each individual story within the document 310 may have different identification information 312 even though the stories are all part of the document 310. The identification information 312 may include identification information for the document 310 as a whole, as well as additional identification information that specifies the story within the document 310. In this way, reproduction control by the photocopier machine 320 may be made on a story by story basis within the document 310 based on the identification information. Furthermore, other identification information 312 may specify the document 310 and individual illustrations/photographs within the document 310 such that illustrators/photographers can enforce individual licensing arrangements for their works using the mechanisms of the illustrative embodiments as described hereafter.

Moreover, identification information 312 can specify pages within the document 310 such that reproduction controls can be applied on a page by page basis within the document 310. Using a combination of these approaches, each individual portion of each page of the document 310 may be subject to separate reproduction controls by the photocopier machine 320. This may be used in a number of different ways to achieve various results of reproduction control based on a reproduction control policy developed from licensing information specified in a central database 340 associated with the remote authorization, accounting, and billing system 330. For example, the various identification information 312 can be used to prevent reproduction of every page of the document 310, e.g., only even numbered pages can be reproduced. The identification information 312 can be used to prevent individual portions of pages from being reproduced, e.g., photographs/illustrations on the pages cannot be reproduced but the text can be reproduced or the reproduction of individual lines, paragraphs, articles, stories, chapters, etc. may be prevented based on the identification information. The number of copies of the document 310, or individual portions of the document 310, may be controlled based on the identification information 312. Many other controls may be implemented so as to enforce licensing arrangements associated with the document 310 or individual portions of the document 310.

In operation, the photocopier machine 320 scans a page of the document 310 using its optical sensor arrangement, e.g., optical scanner 321, and stores the resulting data in a memory or other storage device 326 associated with the photocopier machine 320. This data includes the identification information 312 on the page which is detected through an optical and/or digital filtering mechanism associated with the optical sensor arrangement 321 of the photocopier machine 320. As mentioned above, there may be multiple different types of identification information 312 on the page 320 depending upon the portions of the document 310 included on the page. However, each type of identification information 312 found on the page will at least identify the document 310 as a whole, such as by providing the ISBN of the document 310 or other identifier. In addition, there may be additional identification information 312 encoded that identifies the individual portion or portions 314 of the document 310 included on the scanned page.

Once initial identification information 312 for the document 310 is read/detected by the photocopier machine 320, the reproduction control enforcement engine 323 of the photocopier machine 320 sends a request to the remote authentication, accounting, and billing system 330 (referred to hereafter as simply the "remote system" 330) for authorization to complete the reproduction operation. For example, this request may be transmitted by the photocopier machine 320 via a network connection to one or more digital networks 302 that route the request to the remote system 330. The remote system 330 receives the request via its communication interface 338. A lookup engine 336 of the remote system 330, under the control of the controller 332, performs a lookup operation of the identification information 312 for the document 310 in the associated centralized database 340 to determine the reproduction policy to apply to the scanned portion (s) of the document 310 identified in the request based on the licensing information associated with the identification information 312 for the document 310 in the database 340.

The database 340 stores the licensing information in the form of reproduction control rules and parameters, i.e. a reproduction policy, to be applied to requests for reproduction of the document 310 or portions 314 of the document 310. Moreover, the database 340 may store information pertaining to the identity of individuals or organizations that have reproduced the document 310 or portions 314 of the document 310, the billing information for the individuals or organizations, the number of reproductions made, amounts paid, and other information to facilitate authorization, accounting, and billing for reproductions of the document 310 or portions 314 of the document 310 (hereafter, it should be considered that where reference is made to "the document 310" such also applies to individual portions 314 of the document 310 as well). For example, the reproduction control rules and parameters may specify that reproduction of the document 310 is prohibited without entry of an authorized key code value. The database 340 may store information identifying valid authorization key code values or may have an associated algorithm for determining whether an entered key code is valid or not, e.g., generating a signature based on a key code entered and determining if the signature is one that corresponds to a valid key code value.

Based on the lookup operation by the lookup engine 336 of the remote system 330, if an entry matching the identification information for the document 310 is found in the database 335, the corresponding reproduction policy information is retrieved by the remote system 330. If an entry matching the identification information for the document 310 is not found in the database 340, a response indicating that an entry was not found is returned to the remote system 330. If a response indicating that a matching entry was not found is returned to the remote system 330, the remote system 330 returns a response to the photocopier machine 320 indicating that completion of the reproduction operation is authorized since no reproduction controls are available to the remote system 330.

If a matching entry is found in the database 340, the remote system 330 determines if the entry indicates that the document 310 is subject to reproduction controls, i.e. determines if copies of the document 310 are free or not. If the copies of the document 310 are free, i.e. the document is not subject to reproduction controls, a determination is made as to whether a limited number of free copies is indicated and whether that limited number of free copies has been exceeded or not. The number of free copies may be a number of free copies per user requesting reproduction of the document 310, may be a total number of free copies for all users, or the like. The number of copies of the document 310 that have been made, either in total, per user, both in total and per user, or the like, is maintained in the database 340 for the document 310 and/or individual portions 314 of the document 310.

Assuming that the number of free copies has not met or exceeded a threshold, then a response is sent to the photocopier machine 320 indicating that the completion of the reproduction operation is authorized. If copies of the document 310 are not free, or if the threshold number of free copies has been met or exceeded, then a response is sent to the photocopier machine 320 indicating the reproduction policies to apply to the completion of the reproduction operation. The response further causes the photocopier machine 320 to display a message, such as via output device 324 or user interface 325, indicating that reproduction controls are applicable and that the user must input, such as via user interface 325, an authorization key code or otherwise insert billing or payment information for completing the reproduction operation.

Application of reproduction policies, in one illustrative embodiment, involves applying the reproduction control rules and parameters associated with each identifier in the identification information 312 read from the scanned pages of the document 310 to the portions 314 of the document included on these scanned pages. That is, the identifiers associated with the various reproduction control rules and parameters retrieved from the database 340 based on the identifier information 312 for the document 310 may be matched with corresponding identifiers associated with the reproduction control rules and parameters. The matching reproduction control rules and parameters may be applied to the corresponding portion 314 of the document 310, or the document 310 as a whole, by the reproduction control enforcement engine 323 of the photocopier machine 320 so as to either inhibit completion of the reproduction operation, require entry of billing or payment information before completing the reproduction operation, or modifying the reproduction operation so that the resulting reproduction is not an exact match of the original document 310 or portion 314 of the original document 310.

For example, a page of document 310 may have three different identifiers associated with three different portions of the document 310 that all appear on the page, e.g., a first identifier for a first article A, a second identifier for a second article B, and a third identifier for a photograph C. These identifiers may be repeatedly printed, such as through a watermarking process, on the lines of text for each corresponding portion, in various places across the photograph, or the like. In this way, one cannot avoid the reproduction controls by only reproducing a subsection of the portion of the document 310.

Each of these different identifiers have a portion that corresponds to an identifier for the document 310 as a whole and another portion that uniquely identifies the particular portion of the document 310 to which the identifier corresponds. It should be appreciated that if the document 310 only has one portion, or if separate reproduction controls are not desired for different portions of the document 310, the second portion of the identifier may be eliminated and the same identification information may be used throughout the document 310. The portion of the identifiers corresponding to the document 310 as a whole may be used to perform the lookup operation in the database 340 as discussed above. The result is a set of reproduction control rules and parameters that may be applied to each portion of the document 310.

A second lookup operation may be performed within the reproduction control rules and parameters returned by the remote system 330 to the photocopier machine 320 to identify the particular subset of these reproduction control rules and parameters that apply to the particular portions A, B, and C, appearing on the page that is the subject of reproduction. The particular subsets of these reproduction control rules and parameters may then be applied to these portions A, B, and C when generating the reproduction of the page of the document 310.

For example, when performing the reproduction of the document 310, any reproduction control rules and parameters that apply to the document 310 as a whole may first be applied. Typically, this may involve requiring that the user enter an authorization key code, such as via user interface 325, indicating that they are authorized to reproduce the document 310 or portions thereof. This may further involve entry of billing information, e.g., an account number, or payment information, e.g., credit card number, swiping a credit card in a reader machine coupled to the photocopier machine 320, inserting monetary units in order to obtain a credit, or the like. In one illustrative embodiment, the user may be provided with an authorization key code when registering with a photocopier service provider, or publisher of document 310. For example, a user may register with the organization IEEE and be provided with an authorization key code that links with the user's registration information (which may include billing and payment information), which the user may then use to obtain reproductions of IEEE published documents. The parameters that apply to the document 310 as a whole may include, for example, a price per page, maximum number of copies, or the like.

Once reproduction control rules and parameters for the document 310 as a whole are applied in the manner outlined above, reproduction control rules and parameters for individual portions 314 of the document 310, if any, may be applied to the particular portions 314 on the page(s) that are subject to reproduction, i.e. that have been scanned by the photocopier machine 320. For example, portion A may have a reproduction control rule that states that only page 93 of the document 310 having this portion A on it may be reproduced and that all other pages with this portion cannot be reproduced. As a result, if the page of document 310 that is being reproduced is not page 93, this portion, i.e. portion A, of the page may be eliminated or otherwise obscured in the resulting reproduction output by the output device 324 generated by the photocopier machine 320. The particular page number of the page of document 310 that is attempting to be reproduced may be determined through optical character reading of the page number from the page, for example.

The reproduction control rules and parameters for portion A may further state that, for portion A appearing on page 93, the particular royalty rate is $0.03. This royalty rate may be combined with royalty rates of other portions of the document 310 appearing on the page to generate a total cost for reproduction of the page. Alternatively, the royalty rate may be a percentage of a pre-established price per page for reproducing the document 310 as may be specified in the reproduction control rules and parameters for the document 310 as a whole.

Portion B may have reproduction control rules allowing copies of this portion of the document 310, but only a limited number of copies, e.g., 3 copies. Moreover, the reproduction control rules for portion B may specify a different royalty rate than for portion A, e.g., $0.02 per page or a different percentage of the pre-established price per page. If the number of copies that this particular user, as identified by the authorization key code, billing information, payment information, or the like, has made does not meet or exceed the limited number of copies, then the resulting reproduction made by the photocopier machine 320 may include portion B. Alternatively, portion B may be eliminated or obscured in the resulting reproduction.

Portion C may have reproduction control rules that state that no copies of portion C are permitted. In this case, the resulting reproduction generated by the photocopier machine 320 will either eliminate or obscure the photograph in portion C. Thus, the reproduction generated by the photocopier machine 320 may be tailored to the particular reproduction control rules and parameters specified for the various portions of the document 310 appearing on the original page from which the reproduction is generated. In this way, providers of different portions of a document 310 may each specify their own individual reproduction control rules and parameters and have them enforced by the mechanisms of the illustrative embodiments.

While the above illustrative embodiments provide a more complex mechanism for tailored generation of reproduction copies of a document 310 or portions of a document 310, it should be appreciated that many documents 310 may not require such complex determinations and application of reproduction control rules and parameters. For example, if the document 310 has only one set of reproduction control rules and parameters that apply to the document 310 as a whole, i.e. there are no subsets of the reproduction control rules and parameters that apply to portions of the document 310, then the set of reproduction control rules and parameters may be applied to all portions of the document 310 subject to reproduction, i.e. scanned by the photocopier machine 320. However, even in this embodiment, one cannot circumvent the reproduction control rules and parameters associated with the document 310 since the identifier information is present at multiple locations on each page of the document 310, either selected at random, according to a predefined pattern, or placed on every line of the page of the document 310.

With any of the above illustrative embodiments, the authentication key code, billing information, or payment information may be received from the photocopier machine 320 in the remote system 330 for authentication prior to allowing the reproduction operation to complete. The authentication key code may be analyzed to determine if it is valid or not and only when valid will a response be sent back indicating completion of the reproduction operation is permitted; otherwise a response may be sent back to terminate the reproduction operation. Similarly, billing and payment information may be validated, such as by way of a credit card validation procedure, for example, as is generally known in the art, prior to permitting completion of the reproduction operation.

Furthermore, the database 340 may be updated following completion of the reproduction operation to reflect the additional copies of the document 310 or portions of the document 310 that were made as part of the reproduction operation. This update may identify the number of copies made by the particular user, as identified by the authentication key code, billing information, or payment information for example, the number of copies in total made of the document 310 or portion of the document 310, an amount of royalties paid per user and/or in total for the document 310 or portions of the document 310, and the like. The updated database 340 information may be used for controlling future reproduction operations and to inform the provider of the document 310 or portions of the document 310 of the updates. For example, updates to numbers of copies and royalties paid may be sent to the provider of the document 310 or portions thereof, to inform them for purpose of record keeping.

It should be appreciated that the various illustrative embodiments set forth above specify examples of the types of reproduction control rules and parameters that may be applied to the document 310 or portions of the document 310. These are only examples and are not intended to state or imply any limitation of the present invention with regard to the types or combinations of reproduction control rules and parameters that may be used with the mechanisms of the present invention. To the contrary, many different types and combinations of reproduction control rules and parameters may be utilized as will become apparent to those of ordinary skill in the art in view of the disclosure provided herein.

It should be noted that while the above illustrative embodiments are described in terms of an enhanced photocopier machine 320, as discussed above, the illustrative embodiments are not in fact limited to photocopier machines. For example, the mechanisms of the illustrative embodiments may also be applied to other reproduction devices/machines, such as scanners, and the like. In addition, depending upon the particular reproduction device/machine in which the illustrative embodiments are implemented, the illustrative embodiments may provide additional functionality either in addition to or in replacement of one or more of the operations outlined above.

For example, with a scanner coupled to a computing device, the illustrative embodiments may provide functionality for automatically generating metadata for controlling distribution and reproduction of any electronic files generated based on the physical hard copy document. As one example, based on the reproduction rules and parameters retrieved from the database 340, which correspond to the identification information/identifiers read from the physical hard copy document, metadata may be automatically generated to encode the reproduction rules and parameters into the file(s) generated by the scanner based on the scanning of the physical hard copy document.

This metadata may be used to control the manner by which the file(s) may be reproduced or distributed. For example, the metadata may specify a certain number of printouts of the file are permitted, an authentication code that needs to be input before the file(s) may be displayed/printed, or the like. The metadata may be inserted into the resulting file(s) such that the metadata is read by any application attempting to read the file(s) and is utilized by that application to control access to the file(s). The application may request that the user insert an authentication code before allowing access to the file(s), check the number of printouts or copies of the file(s) that may be generated, etc. Based on the checking of the metadata, and the application of the metadata, access to the file(s) may be allowed/not allowed, or limited in one way or another based on the particular implementation.

It should further be noted that, while the above illustrative embodiments are described in terms of the photocopier machine/reproduction machine performing the operations for applying the reproduction rules and parameters, the illustrative embodiments are not limited to such. Rather, the operations discussed above may be implemented in the remote system entirely without departing from the spirit and scope of the illustrative embodiments. Furthermore, other distributions of operations between the remote system and the reproduction machine/photocopier machine may be made without departing from the spirit and scope of the illustrative embodiments.

Thus, the illustrative embodiments provide mechanisms for reproduction controls based on identification information embedded in physical hard copy documents. The identification information contains identifiers that may be placed in multiple locations across the pages of the physical hard copy document, such as at random locations on each page, every line of pages of the document, or the like. The placement of the identifiers is such that one cannot circumvent detecting the identifiers by only attempting to reproduce a portion of the page of the document or a portion of the document. Moreover, the reproduction controls are such that they may be applied to the document as a whole or individual portions of the document in a customizable manner when reproducing the physical hard copy document as a physical hard copy reproduction or electronic reproduction. Furthermore, the illustrative embodiments provide an ability to automatically generate metadata for insertion in the file(s) to control subsequent output or reproduction of the file(s).

Figure 4:
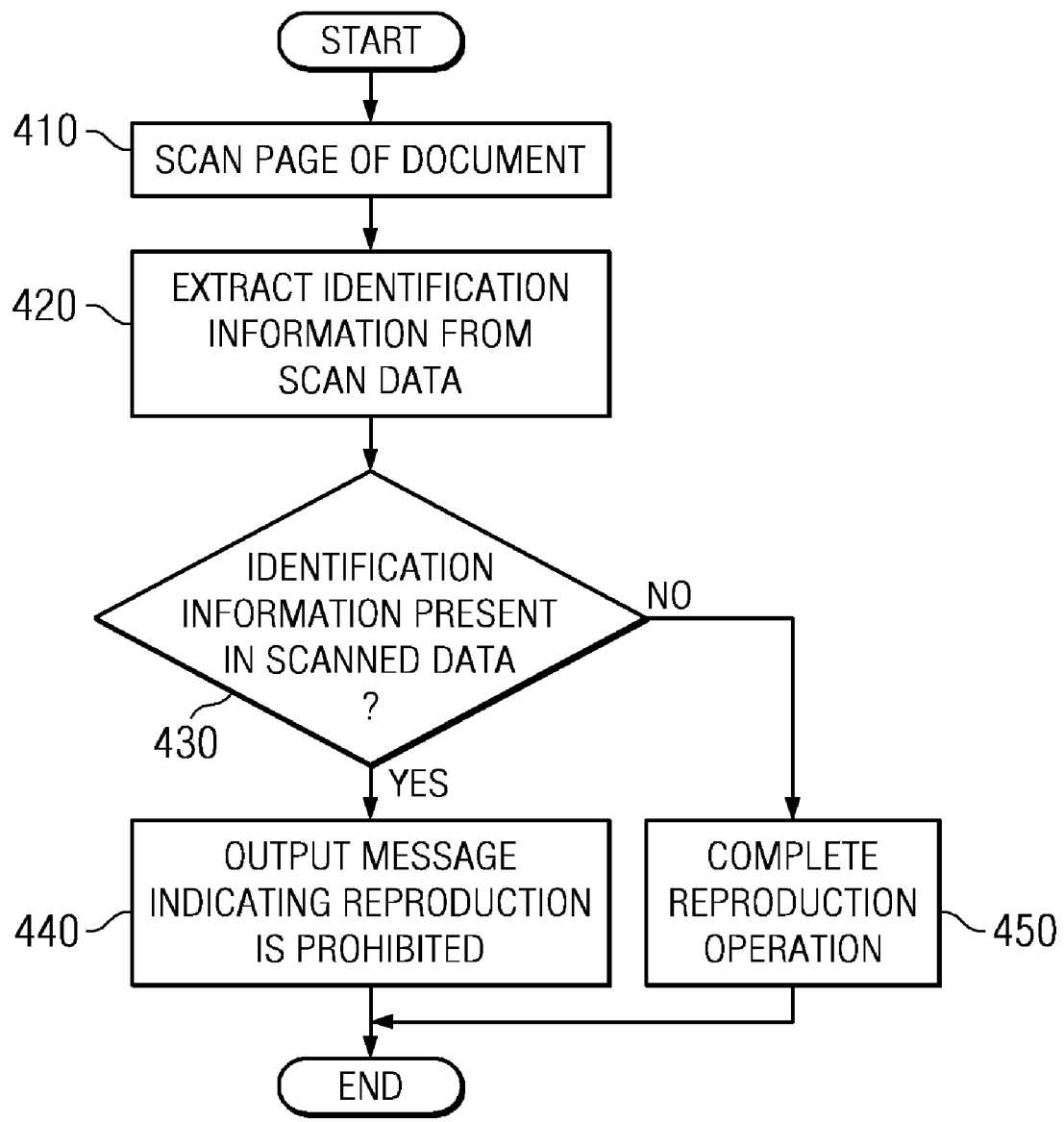
FIG. 4 is a flowchart outlining an exemplary operation for controlling reproduction of a physical hard copy document in accordance with one illustrative embodiment.

FIG. 4 is a flowchart outlining an exemplary operation for controlling reproduction of a physical hard copy document in accordance with one illustrative embodiment. In this illustrative embodiment, the presence of identification information on a scanned page of the document results in the scanned page of the document not being able to be reproduced by the mechanisms of the illustrative embodiment. This illustrative embodiment does not require communication with the remote system since all that is necessary is to determine if identification information is actually present on the page of the physical hard copy document or not. Thus, the operation outlined in FIG. 4 may be implemented in hardware of the reproduction machine itself. Alternatively, communication with the remote system can still be performed with the operations of FIG. 4 being distributed between the reproduction machine and the remote system.

As shown in FIG. 4, the operation starts by scanning a page of the document (step 410). In scanning the page of the document, the human visible content, i.e. text and images, are detected as well as the non-human visible content, i.e. the identification information (e.g., one or more watermarks), if any. The identification information is extracted from the other data obtained by the scanning of the page of the document, if the identification information is present (step 420). A determination is made as to whether identification information was actually extracted from the page of the document (step 430).

If identification information was extracted, then a message is output on the reproduction machine, or a computing device coupled to the reproduction machine, indicating that reproduction of the page of the document is prohibited (step 440). If identification information was not extracted, then reproduction of the page of the document may be completed (step 450). The operation then terminates. It should be appreciated that this process can be repeated for each page of the document scanned by the reproduction machine.

Figure 5:
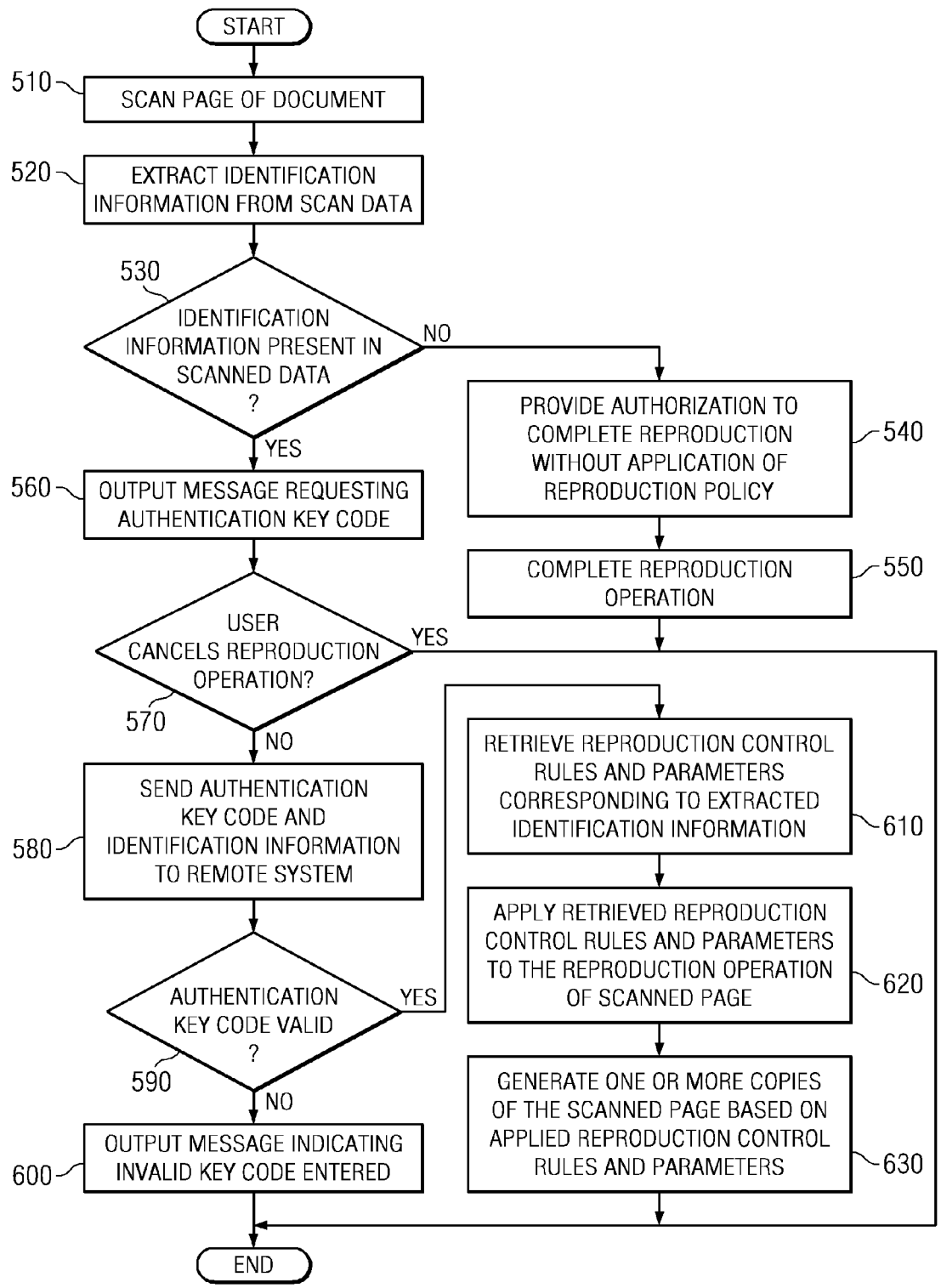
FIG. 5 is a flowchart outlining an exemplary operation of a reproduction control system in accordance with another illustrative embodiment.

In another illustrative embodiment, reproduction control rules and parameters may be used and applied based on the particular identifiers extracted from the data read from the scanned page of the document. FIG. 5 is a flowchart outlining an exemplary operation of a reproduction control system in accordance with another illustrative embodiment. As shown in FIG. 5, the operation starts by scanning a page of the document (step 510). In scanning the page of the document, the human visible content, i.e. text and images, are detected as well as the non-human visible content, i.e. the identification information (e.g., one or more watermarks), if any. The identification information is extracted from the other data obtained by the scanning of the page of the document, if the identification information is present (step 520). A determination is made as to whether identification information was actually extracted from the page of the document (step 530).

If identification information was not extracted, then reproduction of the page of the document may be completed without application of reproduction control rules or parameters (step 540). The reproduction of the page of the document is completed (step 550) and the operation terminates.

If identification information was extracted, then a message is output on the reproduction machine, or a computing device coupled to the reproduction machine, requesting that the user input an authentication key code (step 560). A determination is made as to whether the user cancels the operation or enters an authentication code (step 570). If the user cancels the operation, the operation terminates without completing the reproduction of the page of the document. If the user enters an authentication key code, the authentication key code and the identification information for the page of the document is sent to a remote system for authentication and retrieval of reproduction control rules and parameters corresponding to the identification information (step 580).

A determination is made as to whether the authentication key code is valid or not by comparing the authentication key code to valid key codes corresponding to the identifier of the document (step 590). Alternatively, rather than a comparison to valid key codes, an algorithm may be run on the authentication key code that determines whether it is valid or not. If the authentication key code is not valid, a message may be transmitted to the reproduction machine and/or a computing device coupled to the reproduction machine which then is output to the user indicating that the reproduction operation could not be completed due to an invalid authentication key code (step 600). If the authentication key code is valid, reproduction control rules and parameters corresponding to the identifiers extracted from the scan of the page of the document are retrieved (step 610). The retrieved reproduction control rules and parameters are then applied to the reproduction operation of the page of the document (620). This may involve the remote system applying the reproduction control rules and parameters, the reproduction control rules and parameters being sent to the reproduction machine and/or computer associated with the reproduction machine which then applies them to the reproduction operation, or the like. Furthermore, as noted above, the reproduction control rules and parameters may take many different forms and thus, may be applied in different ways depending upon the implementation. For example, if the reproduction control rules specify a maximum number of copies of the page that may be made by a single user, then this number may be compared to the number of copies requested by the user and the number of copies output may be automatically adjusted accordingly. Likewise, as mentioned above, different rules and parameters may be applied to different portions of the page of the document such that the copy that is generated is modified from the original physical hard copy document based on the application of these reproduction control rules and parameters, e.g., portions of the page may be omitted or obfuscated.

One or more copies of the scanned page of the document are generated based on application of the reproduction control rules and parameters (step 630). The operation then terminates. As mentioned above, this operation may be repeated for each additional page of the document that is scanned. It should further be appreciated that multiple pages of the document may be cached and the collection of identification information and corresponding reproduction control rules and parameters for the collection of identification information may be operated on as a batch, for example. Any number of pages of a document may be processed in a batch manner using such an approach.

Thus, the illustrative embodiments provide mechanisms for detecting identifiers of reproduction controlled documents for use in correlating with reproduction control rules and parameters. The identifiers may be associated with individual portions of the document or pages of the document such that customized application of reproduction control rules and parameters may be made to these individual portions. Moreover, the identifiers are placed throughout the page or at randomly determined locations on the page so as to eliminate the ability of a user to circumvent the detection of these identifiers.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for reproducing a physical hard copy article as a copy of the article, comprising:
    electronically scanning a surface of the physical hard copy article using a scanning mechanism to generate scanned data;
    extracting a reproduction control identifier from the scanned data; and
    controlling output of a reproduction of the physical hard copy article based on the reproduction control identifier that was extracted from the scanned data, wherein the physical hard copy article has a plurality of reproduction control identifiers present in multiple locations on the surface of the physical hard copy article such that content of portions of the physical hard copy article provided on the surface cannot be electronically scanned by the scanning mechanism without detecting a reproduction control identifier in the plurality of reproduction control identifiers, wherein the surface of the physical hard copy article has a first portion of content and a second portion of content, the first portion of content having different content provided thereon than the second portion of content, and wherein the plurality of reproduction control identifiers comprises one or more first reproduction control identifiers associated with the first portion of content and one or more second reproduction control identifiers, the one or more first reproduction control identifiers encoding different identifier information than the one or more second reproduction control identifiers.

2. The method of claim 1, wherein each line of text and each image on the physical hard copy article has an associated one of the reproduction control identifiers provided on the surface of the physical hard copy article.

3. The method of claim 1, wherein the reproduction control identifiers are located at random locations on the surface of the physical hard copy article.

4. The method of claim 1, wherein the reproduction control identifiers are non-human readable and are integrated with the text and images on the physical hard copy article.

5. The method of claim 1, wherein each reproduction control identifier in the plurality of reproduction control identifiers include a first identifier for identifying the physical hard copy article and a second identifier for identifying a portion of content of the physical hard copy article with which the reproduction control identifier corresponds.

6. The method of claim 1, wherein the one or more first reproduction control identifiers specifies a different control for controlling reproduction of the first portion of content from a control for controlling reproduction of the second portion of content specified by the one or more second reproduction control identifiers, and wherein reproduction of the first portion of content is controlled according to the one or more first reproduction control identifiers and reproduction of the second portion of content is controlled according to the one or more second reproduction control identifiers when generating the reproduction of the physical hard copy article.

7. The method of claim 6, wherein, by virtue of controlling reproduction of the first portion of content differently from controlling reproduction of the second portion of content, the reproduction of the physical hard copy article is different from the physical hard copy article.

8. The method of claim 7, wherein the reproduction of the physical hard copy article is different from the physical hard copy article in that one of the first portion of content or the second portion of content is not included or is modified in the reproduction of the physical hard copy article.

9. The method of claim 6, wherein the one or more first reproduction control identifiers specifies a different first amount of compensation for reproduction of the first portion of content from a second amount of compensation for reproduction of the second portion of content specified by the one or more second reproduction control identifiers, and wherein controlling reproduction of the first portion of content comprises charging a user a monetary amount corresponding to the first amount of compensation and controlling reproduction of the second portion of content comprises charging the user a monetary amount corresponding to the second amount of compensation when generating the reproduction of the physical hard copy article.

10. A computer program product comprising a non-transitory computer readable storage medium having a computer readable program recorded thereon, wherein the computer readable program, when executed on a computing device, causes the computing device to:
    electronically scan a surface of the physical hard copy article using a scanning mechanism to generate scanned data;
    extract a reproduction control identifier from the scanned data; and
    control output of a reproduction of the physical hard copy article based on the reproduction control identifier that was extracted from the scanned data, wherein the physical hard copy article has a plurality of reproduction control identifiers present in multiple locations on the surface of the physical hard copy article such that content of portions of the physical hard copy article provided on the surface cannot be electronically scanned by the scanning mechanism without detecting a reproduction control identifier in the plurality of reproduction control identifiers, wherein the surface of the physical hard copy article has a first portion of content and a second portion of content, the first portion of content having different content provided thereon than the second portion of content, and wherein the plurality of reproduction control identifiers comprises one or more first reproduction control identifiers associated with the first portion of content and one or more second reproduction control identifiers, the one or more first reproduction control identifiers encoding different identifier information than the one or more second reproduction control identifiers.

11. The computer program product of claim 10, wherein each line of text and each image on the physical hard copy article has an associated one of the reproduction control identifiers provided on the surface of the physical hard copy article.

12. The computer program product of claim 10, wherein the reproduction control identifiers are located at random locations on the surface of the physical hard copy article.

13. The computer program product of claim 10, wherein the reproduction control identifiers are non-human readable and are integrated with the text and images on the physical hard copy article.

14. The computer program product of claim 10, wherein each reproduction control identifier in the plurality of reproduction control identifiers include a first identifier for identifying the physical hard copy article and a second identifier for identifying a portion of content of the physical hard copy article with which the reproduction control identifier corresponds.

15. The computer program product of claim 10, wherein the one or more first reproduction control identifiers specifies a different control for controlling reproduction of the first portion of content from a control for controlling reproduction of the second portion of content specified by the one or more second reproduction control identifiers, and wherein reproduction of the first portion of content is controlled according to the one or more first reproduction control identifiers and reproduction of the second portion of content is controlled according to the one or more second reproduction control identifiers when generating the reproduction of the physical hard copy article.

16. The computer program product of claim 15, wherein, by virtue of controlling reproduction of the first portion of content differently from controlling reproduction of the second portion of content, the reproduction of the physical hard copy article is different from the physical hard copy article.

17. The computer program product of claim 16, wherein the reproduction of the physical hard copy article is different from the physical hard copy article in that one of the first portion of content or the second portion of content is not included or is modified in the reproduction of the physical hard copy article.

18. An apparatus, comprising:
a processor; and
a memory coupled to the processor, wherein the memory comprises instructions which, when executed by the processor, cause the processor to:
electronically scan a surface of the physical hard copy article using a scanning mechanism to generate scanned data;
extract a reproduction control identifier from the scanned data; and
control output of a reproduction of the physical hard copy article based on the reproduction control identifier that was extracted from the scanned data, wherein the physical hard copy article has a plurality of reproduction control identifiers present in multiple locations on the surface of the physical hard copy article such that content of portions of the physical hard copy article provided on the surface cannot be electronically scanned by the scanning mechanism without detecting a reproduction control identifier in the plurality of reproduction control identifiers, wherein the surface of the physical hard copy article has a first portion of content and a second portion of content, the first portion of content having different content provided thereon than the second portion of content, and wherein the plurality of reproduction control identifiers comprises one or more first reproduction control identifiers associated with the first portion of content and one or more second reproduction control identifiers, the one or more first reproduction control identifiers encoding different identifier information than the one or more second reproduction control identifiers.

* * * * *